(12) United States Patent
Machida

(10) Patent No.: US 12,547,191 B2
(45) Date of Patent: Feb. 10, 2026

(54) CONTROL DEVICE FOR ROBOT IN MULTI-AGENT SYSTEM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 18/273,164

(22) PCT Filed: Feb. 24, 2021

(86) PCT No.: PCT/JP2021/006865
§ 371 (c)(1),
(2) Date: Jul. 19, 2023

(87) PCT Pub. No.: WO2022/180682
PCT Pub. Date: Sep. 1, 2022

(65) Prior Publication Data
US 2024/0134396 A1    Apr. 25, 2024

(51) Int. Cl.
*G05D 1/00*     (2024.01)
*G05D 1/698*    (2024.01)

(52) U.S. Cl.
CPC ................. *G05D 1/6983* (2024.01)

(58) Field of Classification Search
CPC ..... G05D 1/6983; G05D 1/695; H04W 4/023; H04L 67/12; B60W 2556/05; B60W 2556/50; B60W 2556/51
(Continued)

(56) References Cited

U.S. PATENT DOCUMENTS

| 2016/0320774 A1* | 11/2016 | Kuhara ............... G05D 1/0287 |
| 2019/0317530 A1* | 10/2019 | Yang .................... G08G 5/0013 |
| 2021/0085146 A1  | 3/2021  | Cho et al. |

FOREIGN PATENT DOCUMENTS

| JP | 2009-110495 A | 5/2009 |
| JP | 2016-212462 A | 12/2016 |

(Continued)

OTHER PUBLICATIONS

Extended European Search Report for EP Application No. 21927785.2, dated on Mar. 6, 2024.
(Continued)

*Primary Examiner* — Aniss Chad
*Assistant Examiner* — Hussam Aldeen Alzateemeh
(74) *Attorney, Agent, or Firm* — Sughrue Mion, PLLC

(57) ABSTRACT

A control device includes a communication unit, a restriction condition calculation unit, and a control unit. The communication unit receives, from a second robot, a current position of the second robot, and restriction-related information used for controlling the second robot based on positions of a first robot and the second robot at past times. The restriction condition calculation unit calculates restriction condition candidates indicating conditions of a range in which movement is possible, based on the current position and the restriction-related information received from the second robot. The restriction condition calculation unit also identifies a restriction condition having the most recent time among the calculated restriction condition candidates. The control unit controls the position of the first robot so as to move in a manner satisfying the restriction condition identified by the restriction condition calculation unit.

3 Claims, 7 Drawing Sheets

(58) Field of Classification Search
USPC .......................................................... 701/23
See application file for complete search history.

(56) References Cited

FOREIGN PATENT DOCUMENTS

| JP | 2017-059217 A | 3/2017 |
|----|---------------|--------|
| JP | 2017-062768 A | 3/2017 |
| JP | 2019-502501 A | 1/2019 |
| JP | 2020-500763 A | 1/2020 |
| WO | 2019/124913 A1 | 6/2019 |

OTHER PUBLICATIONS

International Search Report for PCT Application No. PCT/JP2021/006865, mailed on May 11, 2021.
English translation of Written opinion for PCT Application No. PCT/JP2021/006865, mailed on May 11, 2021.
Da Cai, Sentang Wu, and Jia Deng, "Distributed Global Connectivity Maintenance and Control of Multi-Robot Networks", IEEE Access, vol. 5, 2017, pp. 9398-9414.
Aaron D. Ame, xiangru xu, Jessy W. Grizzle, Paulo and Tabuada, "Control Barrier Function Based Quadratic Programs for Safety Critical Systems", IEEE Transactions on Automatic Control, vol. 62, Issue 8, Aug. 2017, pp. 3861-3876.

\* cited by examiner

CONTROL DEVICE FOR ROBOT IN MULTI-AGENT SYSTEM

This application is a National Stage Entry of PCT/JP2021/006865 filed on Feb. 24, 2021, the contents of all of which are incorporated herein by G8110reference, in their entirety.

TECHNICAL FIELD

The present invention relates to a control technology, and particularly to autonomous control in robots that operate in cooperation.

BACKGROUND ART

In controlling the movement of a plurality of robots, a multi-agent system in which a plurality of robots moves in cooperation may be used. The robot of the multi-agent system determines its own behavior based on information observed by its own sensor and local communication with a nearby robot. The robots operate by maintaining an appropriate distance between the robots by communicating with each other. For example, a technique as disclosed in PTL 1 is disclosed as a technique for controlling a position by performing communication between a plurality of such robots.

PTL 1 discloses a method of moving a robot in such a way as to restore communication when communication disconnection between robots is detected. PTL 2 discloses an autonomous robot including a receiver that communicates with a transmitter carried by a person and a sensor that detects a surrounding object. The robot of PTL 2 operates to avoid contact with an object detected by a sensor. PTL 3 discloses a plurality of autonomous mobile robots that move while recognizing their positions.

NPL 1 discloses a method of maintaining communication by quantifying the strength of communication in the entire multi-agent system and limiting the distance between robots in such a way as to keep the value of the strength of communication equal to or more than a certain value. NPL 2 discloses an automatic control technique for maintaining safety.

CITATION LIST

Patent Literature

PTL 1: JP 2017-62768 A
PTL 2: JP 2019-502501 A
PTL 3: JP 2017-59217 A

Non Patent Literature

NPL 1: Da Cai, Sentang Wu, and Jia Deng, "Distributed Global Connectivity Maintenance and Control of Multi-Robot Networks", IEEE Access, Volume 5, 2017, pp. 9398-9414
NPL 2: Aaron D. Ame, xiangru xu, Jessy W. Grizzle, Paulo and Tabuada, "Control Barrier Function Based Quadratic Programs for Safety Critical Systems", IEEE Transactions on Automatic Control, Volume 62, Issue 8, August, 2017, pp. 3861-3876

SUMMARY OF INVENTION

Technical Problem

However, the technique of PTL 1 is not sufficient in the following points. In the technique of PTL 1, the position of the robot is moved in such a way that the communication is recovered when the communication is disconnected, but the normal operation of the robot cannot be continued. In the techniques of PTL 2, PTL 3, and NPL 1, automatic control cannot be performed when communication cannot be performed. NPL 2 does not describe a technique for performing automatic control when communication cannot be performed. Therefore, the technology described in each of the prior art documents may not be able to continuously control the position of the robot when the communication environment is bad.

In order to solve the above problems, an object of the present invention is to provide a control device and the like capable of continuing control of a position of a robot even in an environment where communication between robots is intermittently performed.

Solution to Problem

In order to solve the above problem, a control device of the present invention includes a constraint condition calculation unit and a control unit. Based on the constraint-related information and the current position information about the first robot and the second robot, the constraint condition calculation unit calculates candidates for a constraint condition indicating a condition of a range in which the first robot is movable, and identifies a constraint condition having a more recent time among the calculated constraint condition candidates. The constraint-related information is information generated using past position information about the first robot and the second robot and used for control of the second robot. The constraint condition calculation unit also identifies a constraint condition having a more recent time among the calculated constraint condition candidates. The control unit controls the position of the first robot in such a way that the first robot operates while satisfying the constraint condition identified by the constraint condition calculation unit.

According to the control method of the present invention, based on the constraint-related information and the current position information about the first robot and the second robot, the constraint condition calculation unit calculates candidates for a constraint condition indicating a condition of a range in which the first robot is movable, and identifies a constraint condition having a more recent time among the calculated constraint condition candidates. The constraint-related information is information generated using past position information about the first robot and the second robot and used for control of the second robot. The control method of the present invention includes identifying a constraint condition having a more recent time among the calculated constraint condition candidates. The control method of the present invention includes controlling the position of the first robot in such a way that the first robot operates while satisfying the constraint condition identified by the constraint condition calculation unit.

The program recording medium of the present invention records a control program. In the control program, based on the constraint-related information and the current position information about the first robot and the second robot, the constraint condition calculation unit calculates candidates for a constraint condition indicating a condition of a range in which the first robot is movable, and identifies a constraint condition having a more recent time among the calculated constraint condition candidates. The constraint-related information is information generated using past position information about the first robot and the second robot and used for control of the second robot. The processing is executed by a computer. The control program causes the computer to execute the step of identifying a constraint condition having a more recent time among the calculated constraint condition candidates. The control program causes the computer to execute the step of controlling the position of the first robot in such a way that the first robot operates while satisfying the constraint condition identified by the constraint condition calculation unit.

Advantageous Effects of Invention

According to the present invention, it is possible to continue control of the position of the robot even in an environment where communication between the robots is intermittently performed.

EXAMPLE EMBODIMENT

First Example Embodiment

Figure 1:
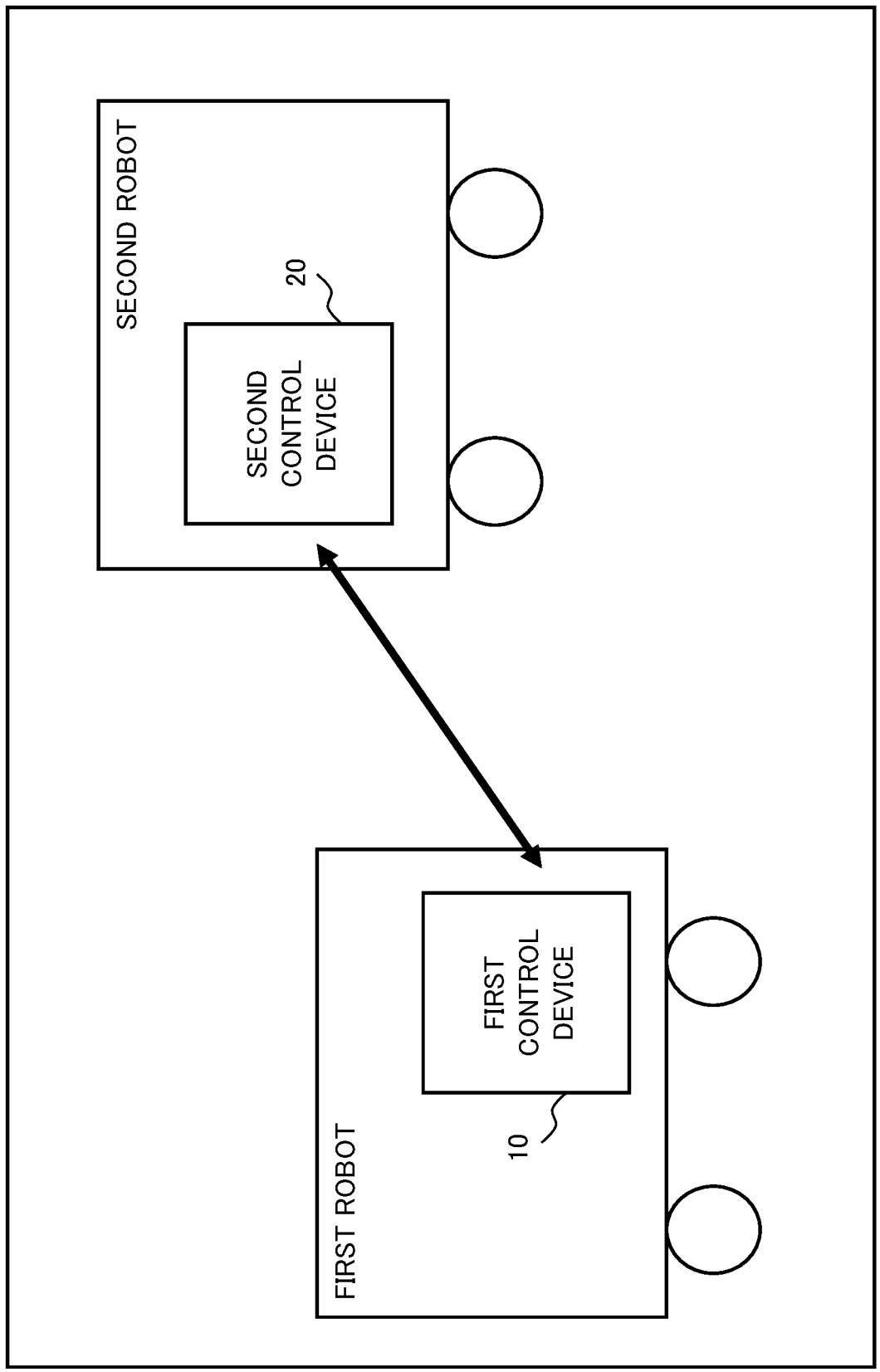
FIG. 1 is a diagram illustrating an outline of a configuration according to the first example embodiment of the present invention.

The first example embodiment of the present invention will be described in detail with reference to the drawings. FIG. 1 is a diagram illustrating a configuration of a control system of the present example embodiment. The control system of the present example embodiment includes a first control device 10 and a second control device 20. The first control device 10 is provided as a control device of the first robot, and controls a position of the first robot. The second control device 20 is provided as a control device of the second robot, and controls the position of the second robot. The control system of the present example embodiment is a control system of a multi-agent system including the first robot and the second robot that operate in cooperation with each other. The number of robots may be three or more. Even in the case of three or more robots, each robot includes a control device.

Figure 2:
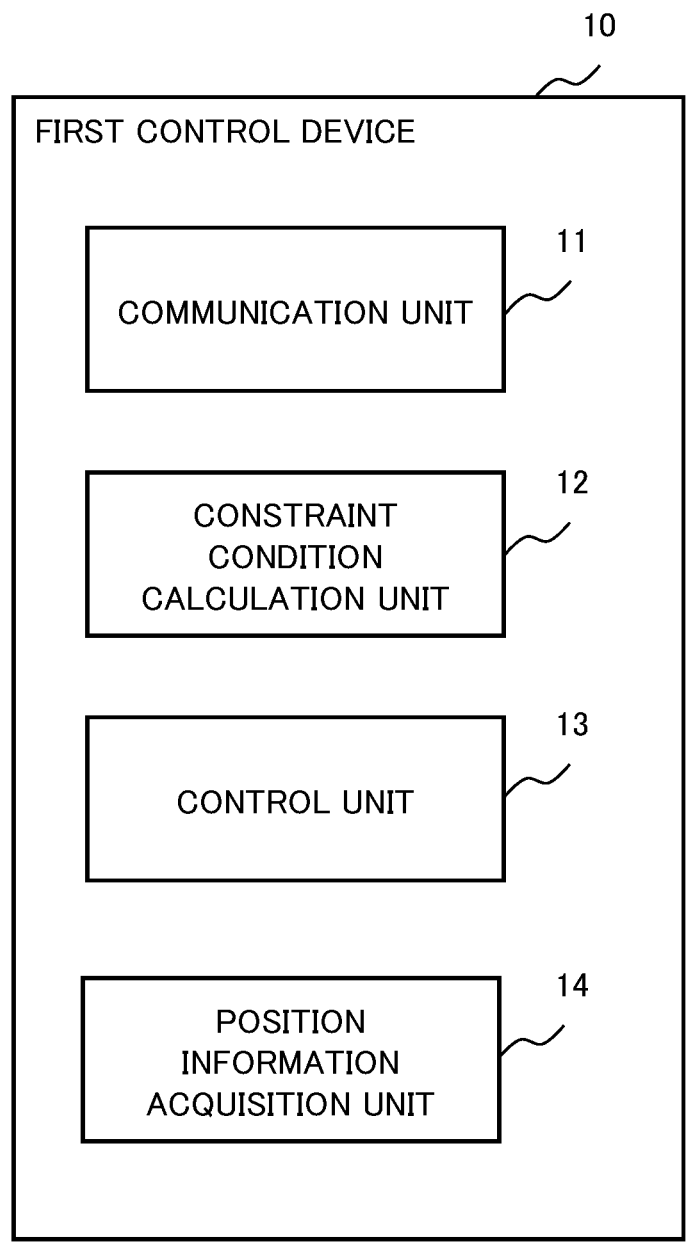
FIG. 2 is a diagram illustrating an example of a configuration of a first control device according to the first example embodiment of the present invention.

A configuration of the first control device 10 will be described. FIG. 2 is a diagram illustrating an example of a configuration of the first control device 10. The first control device 10 includes a communication unit 11, a constraint condition calculation unit 12, a control unit 13, and a position information acquisition unit 14.

The communication unit 11 performs wireless communication with the second control device 20. The communication unit 11 transmits and receives position information and constraint-related information about the robot to and from the second control device 20. The constraint-related information will be described later.

The position information about the first robot at time t is represented by $(x_A(t), t)$. $x_A(t)$ is information (for example, a vector) indicating the position of the first robot at time t. An origin and a coordinate system for indicating the position of the robot by a vector are set in advance at a place where the control system controls the robot. That is, the position information is information in which information indicating the position of the robot at time t and information at time t are associated with each other. Similarly, the position information about the second robot at time t is represented by $(x_B(t), t)$. $x_B(t)$ is information (for example, a vector) indicating the position of the second robot at time t. Hereinafter, for convenience of description, it is assumed that the information indicating the position is represented using a "vector".

Figure 3:
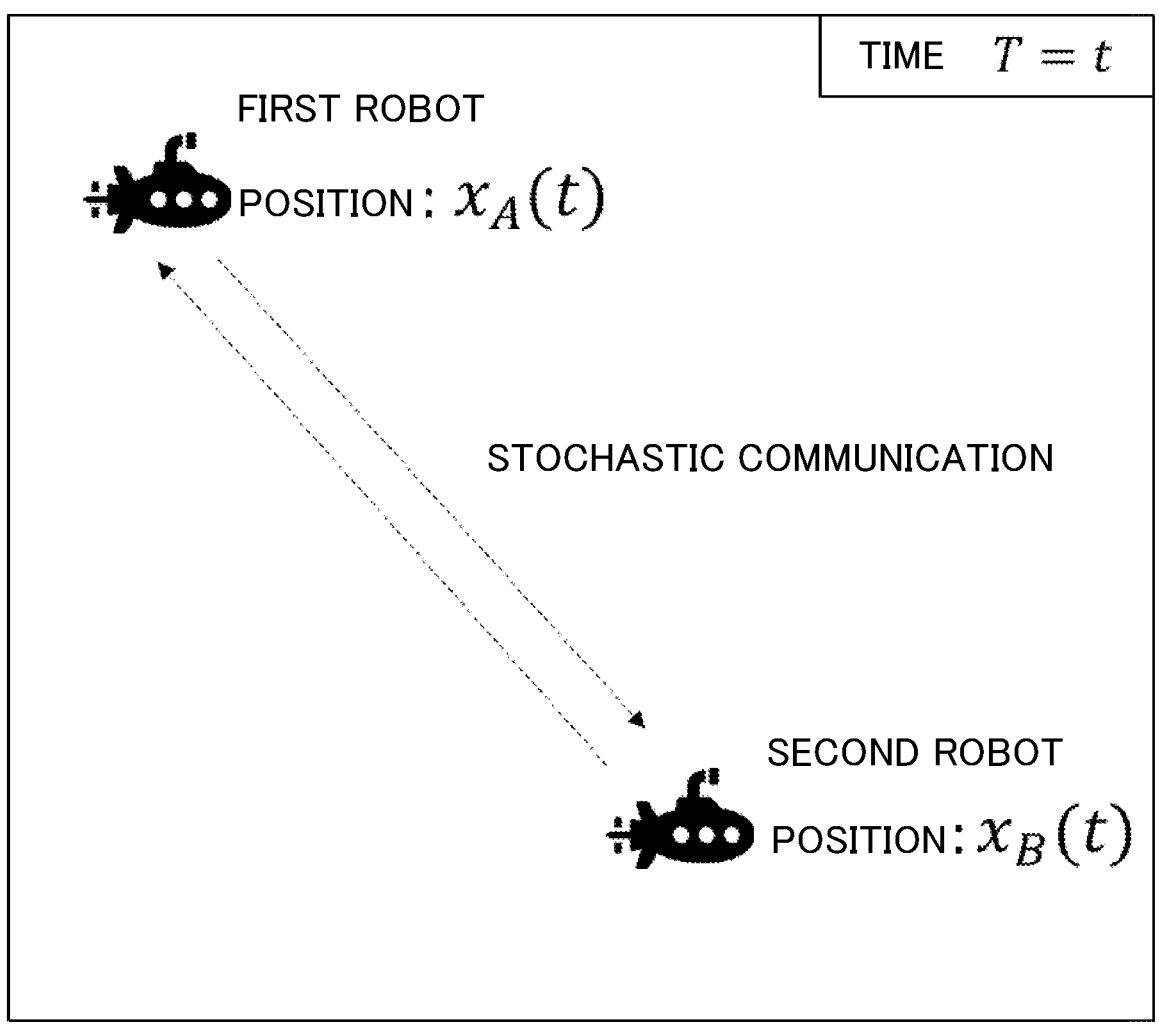
FIG. 3 is a diagram schematically illustrating an example of operation states of a first robot and a second robot according to the first example embodiment of the present invention.

FIG. 3 is a diagram schematically illustrating an example of operation states of the first robot and the second robot. FIG. 3 illustrates that at time t, the first robot is present at the position $x_A(t)$ and the second robot is present at the position $x_B(t)$. The first robot and the second robot in FIG. 3 communicate with each other, but stochastically communicate with each other when the communication environment is poor. That is, when the communication environment is poor, communication between the first control device 10 of the first robot and the second control device 20 of the second robot is performed intermittently. The stochastic and intermittent communication is communication in which constant, alternate, or simultaneous transmission and reception of data is not carried out, and only data transmission from one robot to another robot is continuously performed twice or more when communication cannot be performed due to deterioration of a communication environment.

The constraint-related information is used when the constraint condition calculation unit 12 calculates a constraint condition used when the control unit 13 controls the position of the robot. When the constraint condition is represented by a sphere (or circle), the constraint-related information is, for example, information including a position vector indicating the center point of the constraint and the time when the constraint is set. In other words, the constraint-related information is, for example, information indicating a region where the robot can operate based on a constraint set at a certain time, information indicating a range that limits the position of the robot based on a constraint set at a certain time, or the like. The constraint condition is not necessarily represented by a sphere, and may be represented by a polyhedron such as a rectangular parallelepiped, a curve, or the like. For convenience of description, hereinafter, it is assumed that the constraint-related information is represented by a sphere (or circle).

The constraint-related information is transmitted and received as two pieces of information, for example, the first constraint-related information and the second constraint-related information. At this time, when the first constraint-related information is, for example, set at time t' with the center point of the constraint being $c_1$, the first constraint-related information is represented by ($c_1$, t'). When the second constraint-related information is, for example, set at time t" with the center point of the constraint being $c_2$, the second constraint-related information is represented by ($c_2$, t"). Time t' and time t" may be the same.

The constraint condition calculation unit 12 calculates constraint condition candidates using the position information and the constraint-related information transmitted and received via the communication unit 11, and identifies the constraint condition used for controlling the position of the first robot using the time information. The constraint condition calculation unit 12 sets a constraint condition in such a way that the distance between the robot (for example, a second robot) operating in cooperation and the first robot is equal to or less than the distance R. The value of the distance R is set in advance based on, for example, a communicable distance between a plurality of robots and a distance between robots suitable for the use of the robot.

An example of a method of calculating the constraint condition candidate calculated by the constraint condition calculation unit 12 will be described. It is assumed that the first control device 10 of the first robot acquires ($c_1$, t') as the first constraint-related information, ($c_2$, t") as the second constraint-related information, and position information ($x_B$(t'"), t'") of the second robot from the second robot at time t'".

The constraint condition calculation unit 12 calculates candidates for the first constraint condition at time t using the first constraint-related information with the following Expression 1.

Candidate for First Constraint Condition:

$$\frac{R^2}{4} - \|x_A(t) - c_1\|^2 \geq 0 \qquad \text{[Expression 1]}$$

At this time, $c_{-1}$, which is the center point of the constraint, is expressed as, for example, the following Expression 2.

$$c_1 = \frac{(x_A(t') + x_B(t'))}{2} \qquad \text{[Expression 2]}$$

$\|\ \|$ indicates a norm. However, the expression of the constraint condition may not be indicated using the 2-norm, and various norms can be used. In the constraint-related information, $c_{-1}$ is the coordinate of the center point of the constraint because when the control unit 13 controls the position of the first robot according to the candidate for the constraint condition of Expression 1, the range in which the first robot can move is within the range of a sphere or a circle having $c_{-1}$ as the center point as shown in Expression 2.

The constraint condition calculation unit 12 calculates candidates for the first constraint condition and the second constraint condition at time t using the second constraint-related information with the following Expression 3.

Candidates for First Constraint Condition and Second Constraint Condition:

$$\frac{R^2}{4} - \|x_A(t) - c_2\|^2 \geq 0 \qquad \text{[Expression 3]}$$

At this time, $c_{-1}$, which is the center point of the constraint, is expressed as, for example, the following Expression 4.

$$c_2 = \frac{(x_A(t'') + x_B(t''))}{2} \qquad \text{[Expression 4]}$$

When the control unit 13 controls the position of the first robot according to the candidate for the constraint condition of Expression 2, the range in which the first robot can move is within a sphere or a circle having $c_2$ as the center point as shown in Expression 4.

Based on the position information at time t'", the constraint condition calculation unit 12 calculates the candidate for the second constraint condition with the following Expression 5.

Candidate for Second Constraint Condition:

$$\frac{R^2}{4} - \|x_A(t) - c_3\|^2 \geq 0 \qquad \text{[Expression 5]}$$

$c_3$, which is the center of the constraint, is represented as in Expression 6 below when the position of the first robot at time t'" is $x_A$(t'").

$$c_3 = \frac{(x_A(t''') + x_B(t'''))}{2} \qquad \text{[Expression 6]}$$

The constraint condition calculation unit 12 determines, using time information, which one of the candidates in which the current position of the robot satisfies the condition indicated by each Expression is used among the constraint condition candidates.

$c_1$, $c_2$, and $c_3$ used for the constraint-related information and the constraint condition may not be set at the center as long as they are based on the position information about the first robot and the second robot at a certain time. $c_1$, $c_2$, and $c_3$ may be set as, for example, the inner center or center of gravity of the triangle made by the reference point and the first robot and the second robot. When $c_1$, $c_2$, and $c_3$ are set as the center points of the first robot and the second robot, the value of R is set in consideration of the maximum distance communicable between the first robot and the second robot. When $c_1$, $c_2$, and $c_3$ are set as the center points of the first robot and the second robot, the first robot and the second robot can freely move in a range in which a distance therebetween is R or less.

The constraint condition calculation unit 12 excludes, from among the constraint condition candidates, a candidate in which the current position of the robot does not satisfy the constraint condition. The constraint condition calculation unit 12 sets, as a new constraint condition, a candidate having the most recent time among the remaining constraint condition candidates. The constraint condition calculation unit 12 excludes, from the candidates, a candidate that is older in time than the constraint condition currently used by the control unit 13 for controlling the first robot.

The constraint condition calculation unit 12 determines, as a new first constraint condition, a candidate having a more recent time information of the candidate represented by Expressions 1 and 2 and the candidate represented by Expressions 3 and 4. The term that the time information is more recent means that the time is later than the other time.

The constraint condition calculation unit 12 determines, as a new second constraint condition, a constraint condition having a more recent time information of the candidate represented by Expressions 3 and 4 and the candidate represented by Expressions 5 and 6. When there is no constraint condition candidate, the constraint condition calculation unit 12 does not update the constraint condition.

The control unit 13 controls the robot based on the constraint conditions calculated by the constraint condition calculation unit 12. The control unit 13 controls the position of the first robot in such a way as to satisfy the first constraint condition and the second constraint condition using, for example, a control barrier function. A method for controlling a position using a control barrier function is described in, for example, NPL 2.

The position information acquisition unit 14 identifies the position of the first robot. The position information acquisition unit 14 identifies the position of the first robot using, for example, information obtained from a global navigation satellite system (GNSS). The position information acquisition unit 14 may identify the position of the first robot by a method other than the GNSS. For example, the position information acquisition unit 14 may identify the position of the first robot using distances from a plurality of reference points installed at a place where the first robot is operating. The position information acquisition unit 14 may acquire, from the monitoring system, information on the position of the first robot detected by the monitoring system at the place where the first robot is operating using a camera or a sensor.

The communication unit 11, the constraint condition calculation unit 12, the control unit 13, and the position information acquisition unit 14 of the first control device 10 are configured using a single or a plurality of semiconductor devices. For example, a field programmable gate array (FPGA) can be used as the semiconductor device. Each processing in the communication unit 11, the constraint condition calculation unit 12, the control unit 13, and the position information acquisition unit 14 may be performed by executing a computer program on a central processing unit (CPU).

Figure 4:
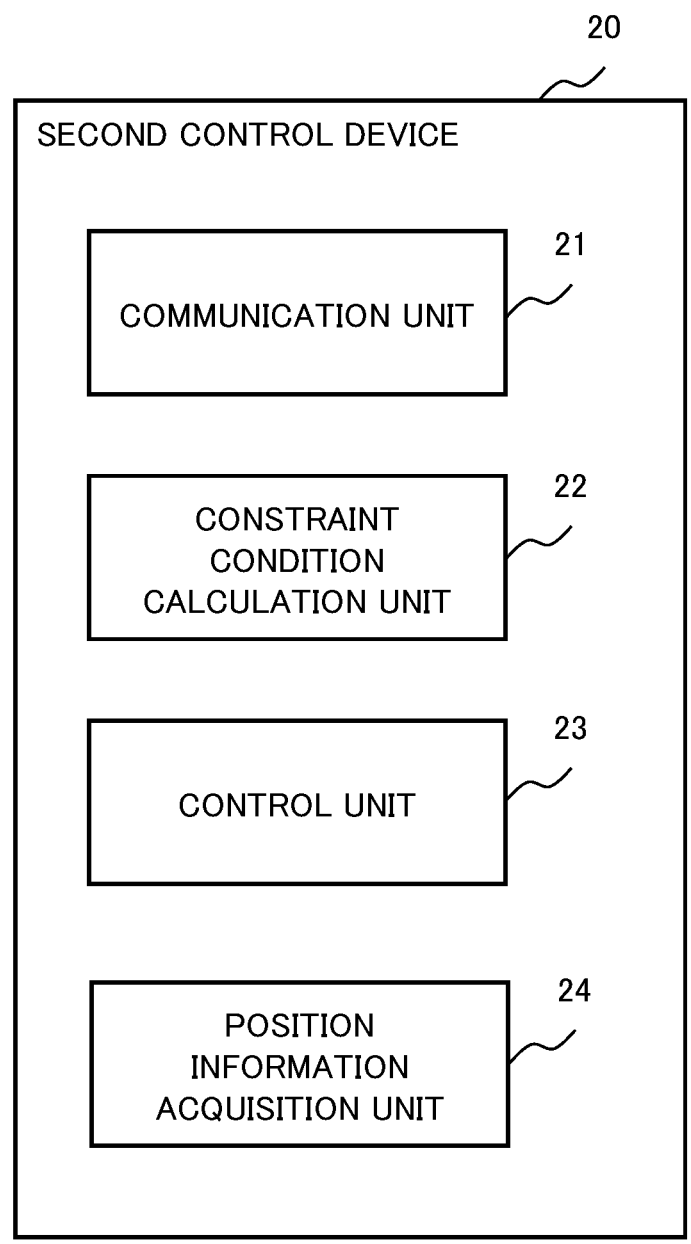
FIG. 4 is a diagram illustrating an example of a configuration of a second control device according to the first example embodiment of the present invention.

A configuration of the second control device 20 will be described. FIG. 4 is a diagram illustrating an example of a configuration of the second control device 20. The second control device 20 includes a communication unit 21, a constraint condition calculation unit 22, a control unit 23, and a position information acquisition unit 24. The configurations and functions of the communication unit 21, the constraint condition calculation unit 22, the control unit 23, and the position information acquisition unit 24 are similar to those of the units having the same names in the first control device 10. That is, the second control device 20 calculates the candidate for the constraint condition of the second robot using the position information and the constraint-related information about the first robot acquired from the first robot and the position information about the second robot. The second control device determines a constraint condition for controlling the position of the second robot using the time information, and controls the position of the second robot in such a way as to satisfy the determined constraint condition.

Figure 5:
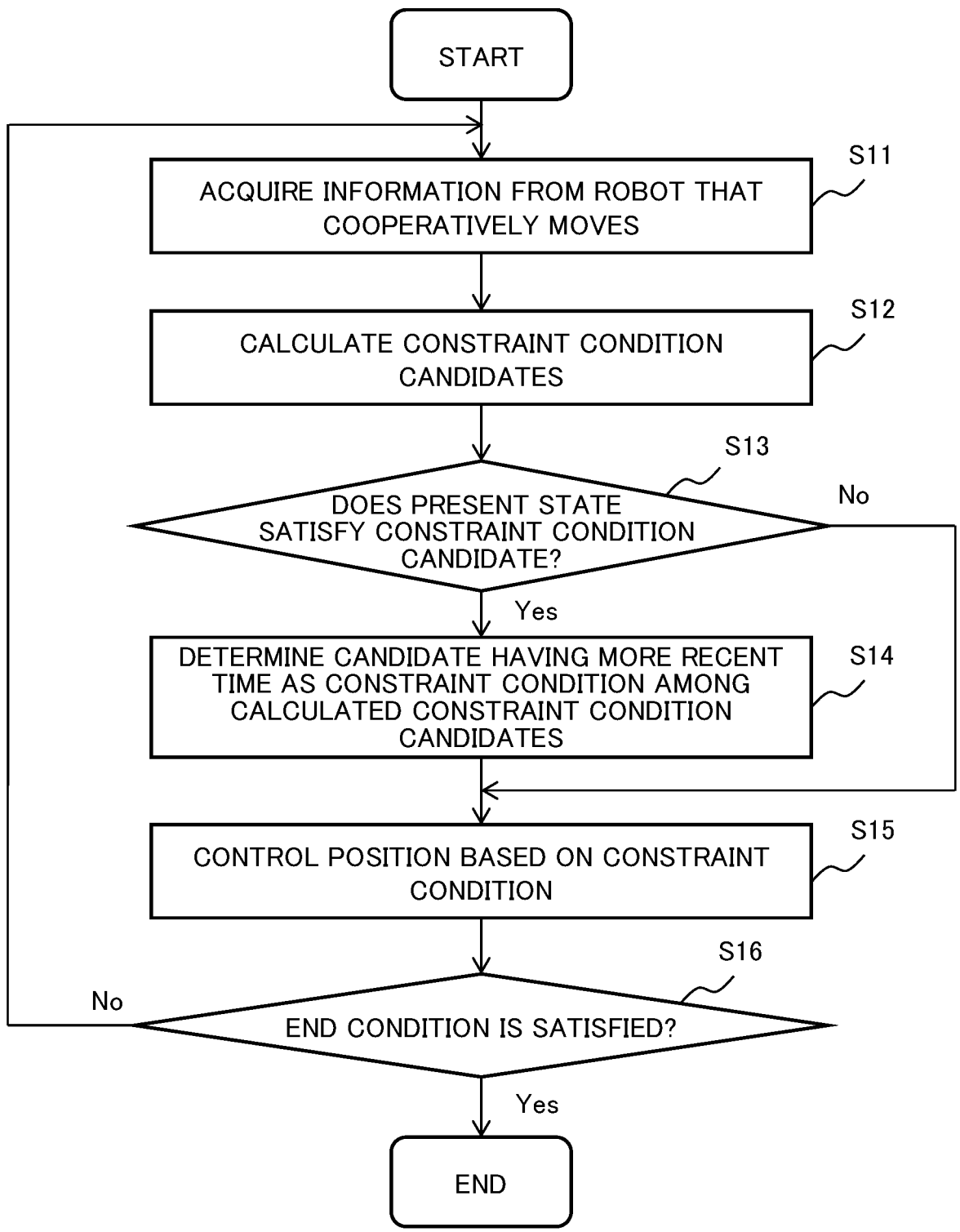
FIG. 5 is a diagram illustrating an example of an operation flow of a first control device and a second control device according to the first example embodiment of the present invention.

An operation of the control system of the present example embodiment will be described. FIG. 5 is a diagram illustrating an example of an operation flow of the first control device 10. In the following description, a case where two robots perform control in such a way that the distance is equal to or less than R will be described as an example. In the following, a case where the first control device 10 of the first robot receives the position information and the constraint-related information about the second robot from the second robot and updates the constraint condition used to control the position of the first robot will be described as an example.

In FIG. 5, the communication unit 11 of the first control device 10 acquires the position information and the constraint-related information about the second robot from the second robot that moves in cooperation (step S11). The communication unit 11 receives, for example, the first constraint-related information ($c_{-1}$, t'), the second constraint-related information ($c_2$, t"), and information about the position $x_B(t''')$ of the second robot at time t'''.

When the constraint-related information and the position information are acquired from the second robot, the constraint condition calculation unit 12 calculates a constraint condition candidate (step S12). For example, the constraint condition calculation unit 12 calculates, from the first constraint-related information, the candidate for the first constraint condition represented by Expressions 1 and 2, and calculates, from the second constraint-related information, the candidate for the first constraint condition represented by Expressions 3 and 4. The constraint condition calculation unit 12 calculates, from the second constraint-related information, the candidate for the second constraint condition represented by Expressions 3 and 4. Furthermore, the constraint condition calculation unit 12 calculates the candidate for the second constraint condition represented by Expressions 5 and 6 based on the position $x_B(t''')$ of the second robot and the position $x_A(t''')$ of the first robot at time t'''. The constraint condition calculation unit 12 acquires the position $x_A(t''')$ of the first robot at time t''' from the position information acquisition unit 14. The position information acquisition unit 14 holds information on the position of the first robot in association with the time when the position of the first robot is identified. The position $x_A(t''')$ of the first robot may be information about the position of the first robot at a time at which the information about the position $x_B(t''')$ of the second robot was obtained.

After calculating the constraint condition candidate, the constraint condition calculation unit 12 determines whether the current state, that is, the current position of the first robot satisfies each candidate for the constraint condition. When there is a constraint condition candidate satisfied by the current state (Yes in step S13), the constraint condition calculation unit 12 compares the time of each constraint condition candidate and determines the constraint condition candidate having a more recent time as a new constraint condition (step S14). For example, when the current state satisfies both the candidate represented by Expressions 1 and 2 and the candidate represented by Expressions 3 and 4, the constraint condition calculation unit 12 compares the times of the two candidates and determines the constraint condition having a more recent time as the first constraint condition. For example, when the current state satisfies both of the candidate represented by Expressions 3 and 4 and the candidate represented by Expressions 5 and 6, the constraint condition calculation unit 12 compares the times of the two candidates and determines the constraint condition having a more recent time as the second constraint condition.

When the first constraint condition and the second constraint condition are determined, the control unit 13 updates the constraint condition used for the control to the first constraint condition and the second constraint condition determined by the constraint condition calculation unit 12. After updating the constraint condition, the control unit 13 controls the position of the first robot in such a way as to satisfy the updated constraint condition (step S15).

In step S13, when there is no constraint condition candidate that satisfies the current state (No in step S13), the control unit 13 controls the position of the first robot using the set constraint condition (step S15). That is, when there is no constraint condition candidate satisfying the current state, the constraint condition is not updated.

In step S15, while the control unit 13 is controlling the position of the first robot, the control unit 13 checks whether information that satisfies the end condition of the operation of the first robot is input. The end condition is set in such a way as to satisfy the condition, for example, when a command to stop the operation of the robot or information indicating that the purpose of the operation of the robot is completed is input to the first control device 10.

When the first robot continues the operation and the end condition is not satisfied (No in step S16), the first control device 10 repeats the operations from step S11. When the end condition is satisfied in step S16 (Yes in step S16), the first control device 10 completes the operation of updating the constraint condition and controlling the position of the first robot.

The operation of the control system of the present example embodiment will be described using a more specific example. When the control system starts the operation of controlling the position of each robot, the first control device 10 and the second control device 20 transmit and receive the respective position information to and from each other. At this time, it is assumed that the position of the first robot is $x_A(t_0)$ and the position of the second robot is $x_B(t_0)$ at time $t_0$.

When the communication unit 11 of the first control device 10 receives the position information about the first robot, the constraint condition calculation unit 12 of the first control device 10 calculates the constraint condition.

The constraint condition calculation unit 12 of the first control device 10 of the first robot calculates the first constraint condition represented by the following Expressions 7 and 8 and the second constraint condition represented by the following Expressions 9 and 10.

First Constraint Condition:

$$\frac{R^2}{4} - \|x_A(t) - c_1^A\|^2 \geq 0 \qquad \text{[Expression 7]}$$

$$c_1^A = \frac{x_A(t_0) + x_B(t_0)}{2} \qquad \text{[Expression 8]}$$

Second Constraint Condition:

$$\frac{R^2}{4} - \|x_A(t) - c_2^A\|^2 \geq 0 \qquad \text{[Expression 9]}$$

$$c_2^A = \frac{x_A(t_0) + x_B(t_0)}{2} \qquad \text{[Expression 10]}$$

At time $t_0$ immediately after the start of the operation, as shown in Expressions 7 and 8 and Expressions 9 and 10, the first constraint condition and the second constraint condition of the first robot are the same.

The constraint condition calculation unit 22 of the second control device 20 of the second robot similarly calculates the first constraint condition represented by the following Expressions 11 and 12 and the second constraint condition represented by the following Expressions 13 and 14.

First Constraint Condition:

$$\frac{R^2}{4} - \|x_B(t) - c_1^B\|^2 \geq 0 \qquad \text{[Expression 11]}$$

$$c_1^B = \frac{x_A(t_0) + x_B(t_0)}{2} \qquad \text{[Expression 12]}$$

Second Constraint Condition:

$$\frac{R^2}{4} - \|x_B(t) - c_2^B\|^2 \geq 0 \qquad \text{[Expression 13]}$$

$$c_2^B = \frac{x_A(t_0) + x_B(t_0)}{2} \qquad \text{[Expression 14]}$$

At time $t_0$ immediately after the start of the operation, as shown in Expressions 11 and 12 and Expressions 13 and 14, the first constraint condition and the second constraint condition of the second robot are also the same.

When the constraint condition is calculated, the control unit 13 of the first control device 10 starts controlling the position of the first robot in such a way as to satisfy the calculated constraint condition.

Similarly, the control unit 23 of the second control device 20 starts controlling the position of the second robot in such a way as to satisfy the constraint condition.

It is assumed that at time $t_1$ after time $t_0$, the first control device 10 of the first robot transmits, to the second robot, the position information about the first robot at time $t_1$, the first constraint-related information, and the second constraint-related information. The first constraint-related information transmitted at this time corresponds to the information on the center point of the first robot and the second robot used for the first constraint condition in the first control device 10. The second constraint-related information corresponds to information on the center point of the first robot and the second robot used for the second constraint condition in the first control device 10. That is, at this time, the first constraint-related information and the second constraint-related information transmitted by the first control device 10 are information at time $t_0$.

Upon receiving the position information and the constraint-related information about the first robot, the constraint condition calculation unit 22 of the second control device 20 calculates a constraint condition. At this time, the first constraint-related information received from the first robot is information at time $t_0$ and includes information on the center point of the constraint represented by Expression 8. The candidate for the first constraint condition calculated by the constraint condition calculation unit 22 using the first constraint-related information is expressed by the following Expression 15.

$$\frac{R^2}{4} - \|x_B(t) - c_1^A\|^2 \geq 0 \qquad \text{[Expression 15]}$$

The constraint condition calculation unit 22 calculates the candidate for the first constraint condition and the candidate for the second constraint condition of the following Expression 16 based on the second constraint-related information including information on the center point of the constraint represented by Expression 10.

$$\frac{R^2}{4} - \|x_B(t) - c_2^A\|^2 \geq 0 \quad \text{[Expression 16]}$$

After calculating the candidates for the first constraint condition and the second constraint condition based on the second constraint-related information, the constraint condition calculation unit 22 calculates the second constraint condition candidate represented by the following Expressions 17 and 18 using the position information at time $t_1$.

$$\frac{R^2}{4} - \|x_B(t) - c_3\|^2 \geq 0 \quad \text{[Expression 17]}$$

$$c_3 = \frac{x_A(t_1) + x_B(t_1)}{2} \quad \text{[Expression 18]}$$

At this time, the constraint condition calculation unit 22 excludes, from the candidate, a constraint condition candidate in which the position of the second robot at time $t_1$ does not satisfy the Expressions.

Assuming that the position of the second robot at time $t_1$ satisfies all of Expressions 15, 16, and 17, the constraint condition calculation unit 22 compares Expressions 15 and 16 when determining the first constraint condition, but determines, for example, Expression 15 as the first constraint condition since they are expressions in which the candidate is calculated using information at the same time. When determining the second constraint condition, the constraint condition calculation unit 22 compares the times in Expression 16 and Expression 17. At this time, since time $t_1$ is more recent than time $t_0$, the constraint condition calculation unit 22 determines Expression 17 at time $t_1$ as the second constraint condition.

As a result of the above processing, the constraint conditions held by the second control device 20 at time $t_1$ are the first constraint condition represented by the following Expressions 19 and 20 and the second constraint condition represented by the following Expressions 21 and 22.

First Constraint Condition:

$$\frac{R^2}{4} - \|x_B(t) - c_1^B\|^2 \geq 0 \quad \text{[Expression 19]}$$

$$c_1^B = \frac{x_A(t_0) + x_B(t_0)}{2} \quad \text{[Expression 20]}$$

Second Constraint Condition:

$$\frac{R^2}{4} - \|x_B(t) - c_2^B\|^2 \geq 0 \quad \text{[Expression 21]}$$

$$c_2^B = \frac{x_A(t_1) + x_B(t_1)}{2} \quad \text{[Expression 22]}$$

When the constraint condition is determined, the control unit 23 controls the position of the second robot in such a way as to satisfy the determined first constraint condition represented by Expressions 19 and 20 and the determined second constraint condition represented by Expressions 21 and 22.

Next, it is assumed that the first control device 10 of the first robot transmits the constraint-related information to the second robot at time $t_2$ after time $t_1$. At this time, since the information transmitted by the first control device 10 is the first constraint-related information and the second constraint-related information at time $t_0$, the constraint condition calculation unit 22 does not update the first constraint condition represented by Expressions 19 and 20 calculated using the information at the same time.

The constraint condition calculation unit 22 calculates the candidate for the second constraint condition based on the second constraint-related information as shown in the following Expressions 23 and 24.

$$\frac{R^2}{4} - \|x_B(t) - c_2^A\|^2 \geq 0 \quad \text{[Expression 23]}$$

$$c_2^A = \frac{x_A(t_0) + x_B(t_0)}{2} \quad \text{[Expression 24]}$$

However, since the information at the time before the time of the current constraint condition is used for the candidate represented by Expressions 23 and 24, the constraint condition calculation unit 22 excludes Expressions 23 and 24 from the candidate. The constraint condition calculation unit 22 calculates the candidate for the second constraint condition using the position information at time $t_2$ with the following Expressions 25 and 26.

$$\frac{R^2}{4} - \|x_B(t) - c_3\|^2 \geq 0 \quad \text{[Expression 25]}$$

$$c_3 = \frac{x_A(t_2) + x_B(t_2)}{2} \quad \text{[Expression 26]}$$

When the candidate for the second constraint condition represented by Expressions 25 and 26 is calculated, since the number of candidates is one, the constraint condition calculation unit 22 determines Expressions 25 and 26 as the second constraint condition.

As a result of the above processing, the constraint conditions held by the second control device 20 at time $t_1$ are the first constraint conditions represented by the following Expressions 27 and 28 and the second constraint conditions represented by Expressions 29 and 30.

First Constraint Condition:

$$\frac{R^2}{4} - \|x_B(t) - c_1^B\|^2 \geq 0 \quad \text{[Expression 27]}$$

$$c_1^B = \frac{x_A(t_0) + x_B(t_0)}{2} \quad \text{[Expression 28]}$$

Second Constraint Condition:

$$\frac{R^2}{4} - \|x_B(t) - c_2^B\|^2 \geq 0 \quad \text{[Expression 29]}$$

$$c_2^B = \frac{x_A(t_2) + x_B(t_2)}{2} \quad \text{[Expression 30]}$$

It is assumed that the second control device 20 of the second robot transmits the constraint-related information to the first robot at time $t_3$ after time $t_2$. At this time, the position information at time $t_3$, the first constraint-related information including the information on the center of the constraint represented by Expression 28 set using the information at time $t_0$, and the second constraint-related information including the information on the center of the constraint represented by Expression 309 set using the information at time $t_2$ are transmitted.

Upon receiving the constraint-related information, the constraint condition calculation unit 12 of the first control device 10 of the first robot calculates a candidate for the first constraint condition. The constraint condition calculation unit 12 calculates the candidate for the first constraint condition represented by the following Expressions 31 and 32 calculated using the first constraint-related information at time $t_0$.

$$\frac{R^2}{4} - \|x_A(t) - c_1^B\|^2 \geq 0 \quad \text{[Expression 31]}$$

$$c_1^B = \frac{x_A(t_0) + x_B(t_0)}{2} \quad \text{[Expression 32]}$$

The constraint condition calculation unit 12 calculates the following Expressions 33 and 34 as the candidate for the first constraint condition and the candidate for the second constraint condition using the second constraint-related information at time $t_2$.

$$\frac{R^2}{4} - \|x_A(t) - c_2^B\|^2 \geq 0 \quad \text{[Expression 33]}$$

$$c_2^B = \frac{x_A(t_2) + x_B(t_2)}{2} \quad \text{[Expression 34]}$$

Further, the constraint condition calculation unit 12 calculates Expressions 35 and 36 as the candidate for the second constraint condition using the position information at time $t_3$.

$$\frac{R^2}{4} - \|x_A(t) - c_3\|^2 \geq 0 \quad \text{[Expression 35]}$$

$$c_3 = \frac{x_A(t_3) + x_B(t_3)}{2} \quad \text{[Expression 36]}$$

At this time, when the position of the first robot satisfies Expressions 31 and 32 and Expressions 33 and 34, the constraint condition calculation unit 12 determines Expressions 33 and 34 having a more recent time information as the first constraint condition. The constraint condition calculation unit 12 compares Expressions 33 and 34 with Expressions 35 and 36, and determines Expressions 35 and 36 at time $t_3$ as the second constraint condition since time $t_3$ is more recent.

The first constraint condition of the first robot after updating the constraint condition at time $t_3$ is as shown in the following Expressions 37 and 38. The second constraint condition of the first robot after updating the constraint condition at time $t_3$ is as shown in the following Expressions 39 and 40.

First Constraint Condition:

$$\frac{R^2}{4} - \|x_A(t) - c_1^A\|^2 \geq 0 \quad \text{[Expression 37]}$$

$$c_1^A = \frac{x_A(t_2) + x_B(t_2)}{2} \quad \text{[Expression 38]}$$

Second Constraint Condition:

$$\frac{R^2}{4} - \|x_A(t) - c_2^A\|^2 \geq 0 \quad \text{[Expression 39]}$$

$$c_2^A = \frac{x_A(t_3) + x_B(t_3)}{2} \quad \text{[Expression 40]}$$

The control unit 13 controls the position of the first robot in such a way as to satisfy the first constraint condition represented by Expressions 37 and 38 and the second constraint condition represented by Expressions 39 and 40.

It is assumed that the first control device 10 of the first robot transmits the position information and the constraint-related information to the second robot at time $t_4$ after time $t_3$. Upon receiving the position information and the constraint-related information, the constraint condition calculation unit 22 of the second control device 20 of the second robot calculates a candidate for the first constraint condition from the first constraint-related information and the second constraint-related information. Since the first constraint-related information transmitted from the first robot to the second robot is information at time $t_2$, the constraint condition calculation unit 22 calculates the following Expressions 41 and 42 as the candidate for a new first constraint condition.

$$\frac{R^2}{4} - \|x_B(t) - c_1^A\|^2 \geq 0 \quad \text{[Expression 41]}$$

$$c_1^A = \frac{x_A(t_2) + x_B(t_2)}{2} \quad \text{[Expression 42]}$$

The second constraint-related information transmitted from the first robot to the second robot is information at time $t_3$, and the constraint condition calculation unit 22 calculates the following Expressions 43 and 44 as candidates for new first and second constraint conditions.

$$\frac{R^2}{4} - \|x_B(t) - c_2^A\|^2 \geq 0 \quad \text{[Expression 43]}$$

$$c_2^A = \frac{x_A(t_3) + x_B(t_3)}{2} \quad \text{[Expression 44]}$$

The constraint condition calculation unit 22 calculates the following Expressions 45 and 46 as the candidate for the second constraint condition using the position information at time $t_4$.

$$R^2 - \|x_B(t) - c_3\|^2 \geq 0 \quad \text{[Expression 45]}$$

$$c_3 = \frac{x_A(t_4) + x_B(t_4)}{2} \quad \text{[Expression 46]}$$

When it is assumed that the position of the second robot satisfies the conditions of all the candidates of the candidate represented by Expressions 41 and 42, the candidate represented by Expressions 43 and 44, and the candidate represented by Expressions 45 and 46, the constraint condition calculation unit 22 determines an expression having a more recent time information as the constraint condition. When the position of the second robot satisfies all the expressions, the constraint condition calculation unit 22 determines Expressions 43 and 44 as the first constraint condition and Expressions 45 and 46 as the second constraint condition using the time information. When the new constraint condition is determined, the control unit 23 updates the constraint condition used for controlling the second robot with the information about the constraint condition determined by the constraint condition calculation unit 22, and controls the position of the second robot in such a way as to satisfy the updated constraint condition.

By repeating the above operation, the constraint condition is updated, and the control unit of each control device controls the robot based on the updated constraint condition. In the above description, for example, only the second robot continues to receive information from the first robot at time $t_1$ and time $t_2$. However, the control units of the first robot and the second robot have common constraint conditions after the update. As described above, from the update rule of the constraint condition, the actual communication is stochastic and the control is performed by the common constraint condition regardless of the order in which the communication is performed.

At a certain time, the first control device 10 of the first robot and the second control device 20 of the second robot hold the common constraint condition as shown in the following Expressions 47 and 48.

First Device Constraint Condition:

$$\frac{R^2}{4} - \|x_A(t) - c\|^2 \geq 0 \qquad \text{[Expression 47]}$$

Second Device Constraint Condition:

$$\frac{R^2}{4} - \|x_B(t) - c\|^2 \geq 0 \qquad \text{[Expression 48]}$$

As shown in Expressions 47 and 48, the first robot and the second robot exist within a common sphere (or circle) with a radius R/2 with the center point as c. Therefore, the distance between the first robot and the second robot is always equal to or less than R.

In the above description, control is performed in such a way that the distance between the first robot and the second robot is equal to or less than R, but a minimum value of the distance between the first robot and the second robot may be further set. In a case where the minimum value is set, for example, the constraint condition can be set by using the minimum value $R_{min}$ instead of R in the expression in which the direction of the inequality is set to be opposite in the above constraint condition expression. When there is no constraint on the communicable distance between the first robot and the second robot, only the minimum value of the distance between the first robot and the second robot may be set as the constraint condition.

A range in which the first robot and the second robot is movable may be set in the constraint-related information. The movable range of the first robot and the second robot is, for example, set as coordinates of vertices of a polygon indicating the movable range. The information about the polygon of n vertices indicating the movable range at time t is indicated as, for example, ([$P_1$, $P_2$, . . . , $P_n$], t). For example, in a case where the polygon is a quadrangle, assuming that $P_1$=(0, 2), $P_2$=(1, 2), $P_3$=(1, 0), and $P_4$=(0, 0), each robot can move in a rectangle having a length of 1 in the x-axis direction and a length of 2 in the y-axis direction. The control devices of the first robot and the second robot may set a range in which the counterpart robot is movable or a range in which its movement is prohibited at time t to transmit the ranges to the counterpart robot as the constraint-related information. With such a configuration, for example, the ranges in which the robot controlled by the control device and the counterpart robot operate can be prevented from overlapping each other.

In the above description, the configuration in which two robots each calculate the constraint condition is taken as an example, but one robot (leader robot) of the two robots may determine the constraint condition for the two robots. In such a configuration, the other robot acquires the constraint condition from the robot that has determined the constraint condition and controls the position.

The control system of the present example embodiment can also use control of three or more robots. For example, the control system may be configured such that in four robots, three follower robots follow the one leader robot. In such a configuration, constraint conditions are set for two× three sets with the leader robot and each follower robot. That is, the leader robot has a total of six constraint conditions, and the follower robot has two constraint conditions.

In the above description, the constraint condition is calculated using the position x(t) of the robot, but x(t) is not limited to only the position information. For example, the constraint condition may be set by information including the orientation and speed of the robot in addition to the position information. In the above description, the square of the norm, $\| \ \|^2$, is used in the calculation of the constraint condition, but the constraint condition may be set using another function.

In a situation with poor visibility and unstable communication such as in the sea, when the distance between the robots increases, it is difficult to observe the position of the counterpart robot with a sensor. In such an environment, communication succeeds only stochastically. When the position of the counterpart robot cannot be directly detected, the robot acquires the position information about the counterpart robot by transmitting and receiving the mutual position information by communication. However, in a situation where communication succeeds only stochastically, it is not possible to always grasp mutual positions. Therefore, in the control system on the premise that communication is continued, each robot may not be able to continue stable control of the position.

On the other hand, the first control device 10 mounted on the first robot in the control system of the present example embodiment acquires information generated using the positions of the first robot and the second robot at the past time, which is the constraint-related information used for the control of the second robot and the position information about the second robot. The first control device 10 calculates a plurality of constraint condition candidates indicating the movement range of the first robot using the constraint-related information and the information on the current position of the second robot, and identifies a constraint condition having a more recent time information among the constraint condition candidates as a constraint condition to be used for controlling the position of the first robot. As described above, by using the condition having a more recent time information while sharing the information with the second robot via the constraint-related information, it is possible to continue the update of the constraint condition and the control of the position of the first robot even in a state where the communication is intermittent due to the deterioration of the communication environment and the bidirectional communication can be performed only stochastically. The same applies to the second control device mounted on the second robot. As a result, the control system of the present example embodiment can continue the control of the position of the robot even in an environment where communication between the robots is intermittently performed.

In other words, the constraint condition calculation unit 12 of the first robot creates information indicating the constraint condition defining the region in which the first robot is operable in such a way that the positional relationship between the first robot and the second robot after at the second time is within the predetermined range (for example, a sphere) using the history of the reference position (for example, $(c_1, t')$, $(c_2, t'')$, and the like, that is, the reference position at the at the first time) for measuring the operation range, the reference position being determined using the position of the first robot at the first time and the position of the second robot at the first time, and the position of the second robot at the second time after at the first time.

In other words, it can be said that by using the reference information indicating the reference position in the constraint information indicating the operation ranges of the first robot and the second robot at the first time, the position information indicating the position of the first robot at the second time after the first time, and the position information indicating the position of the second robot at the second time, the constraint condition calculation unit 12 calculates the reference position in the constraint information indicating the operation range of the first robot in such a way that the positional relationship between the first robot and the second robot after the second time is within the predetermined range.

Then, the control unit 13 controls the position of the first robot in such a way that the first robot operates while satisfying the constraint information (for example, in a sphere, in a polyhedron, in a polygon, out of a circle, etc.) determined by the calculated reference position. In other words, it can be said that the control unit 13 controls the operation of the first robot after the second time according to the constraint information determined by the calculated reference position.

Then, the constraint condition calculation unit 12 in the first robot may update the information indicating the constraint condition by performing the process similar to the process described above after a certain time has elapsed. The second control device 20 of the second robot also performs a process similar to that of the first control device 10 of the first robot.

When the processing in FIG. 5 is described in other words, it can be said that the constraint condition calculation unit 12 performs a process of selecting, from constraint information at the first time and constraint information at the second time after the first time, the constraint information indicating a constraint condition defining a region where the first robot and the second robot can operate, constraint information in which the position of the first robot at the third time after the second time satisfies the constraint condition. Then, the control unit 13 controls the operation of the first robot after the third time according to the selected constraint information.

Note that the time at which the communication is performed and the time at which the position information is acquired are not necessarily the same. The first control device 10 and the second control device 20 do not necessarily need to exchange mutual position information at a certain time. For example, at a certain time, the second control device 20 may acquire the position of the first robot at the first time, and at a time different from the certain time, the first control device 10 may acquire the position of the second robot at the first time.

Second Example Embodiment

Figure 6:
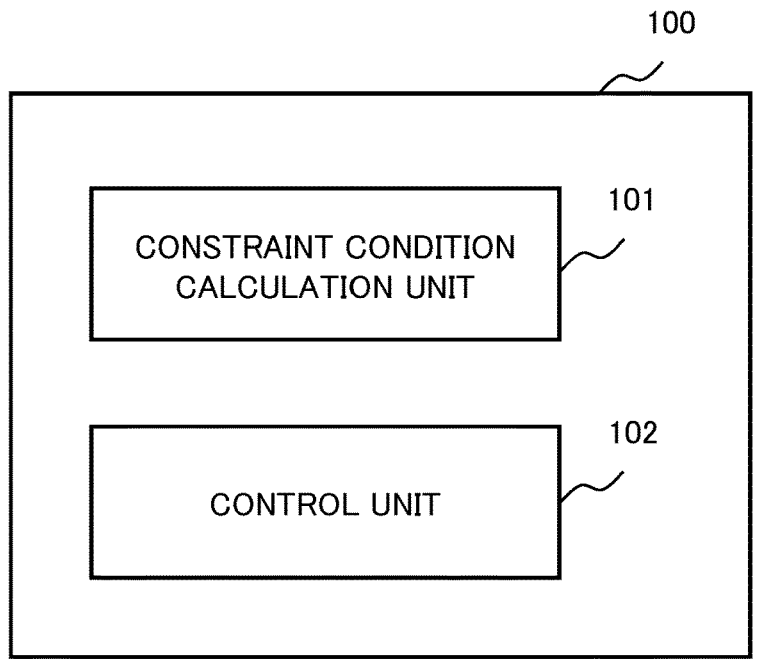
FIG. 6 is a diagram illustrating an outline of a configuration according to the second example embodiment of the present invention.

The second example embodiment of the present invention will be described in detail with reference to the drawings. FIG. 6 is a diagram illustrating an example of a configuration of a control device 100 according to the present example embodiment.

The control device 100 according to the present example embodiment includes a constraint condition calculation unit 101 and a control unit 102. Based on the constraint-related information and the current position information about the first robot and the second robot, the constraint condition calculation unit 101 calculates candidates for a constraint condition indicating a condition of a range in which the first robot is movable, and identifies a constraint condition having a more recent time among the calculated constraint condition candidates. The constraint-related information is information generated using past position information about the first robot and the second robot and used for control of the second robot. The control unit 102 controls the position of the first robot in such a way that the first robot operates while satisfying the constraint condition identified by the constraint condition calculation unit 101.

The constraint condition calculation unit 12 and the position information acquisition unit 14 according to the first example embodiment are an example of the constraint condition calculation unit 101. The constraint condition calculation unit 101 is an aspect of a constraint condition calculation means. The control unit 13 of the first example embodiment is an example of the control unit 102. The control unit 102 is an aspect of a control means.

Figure 7:
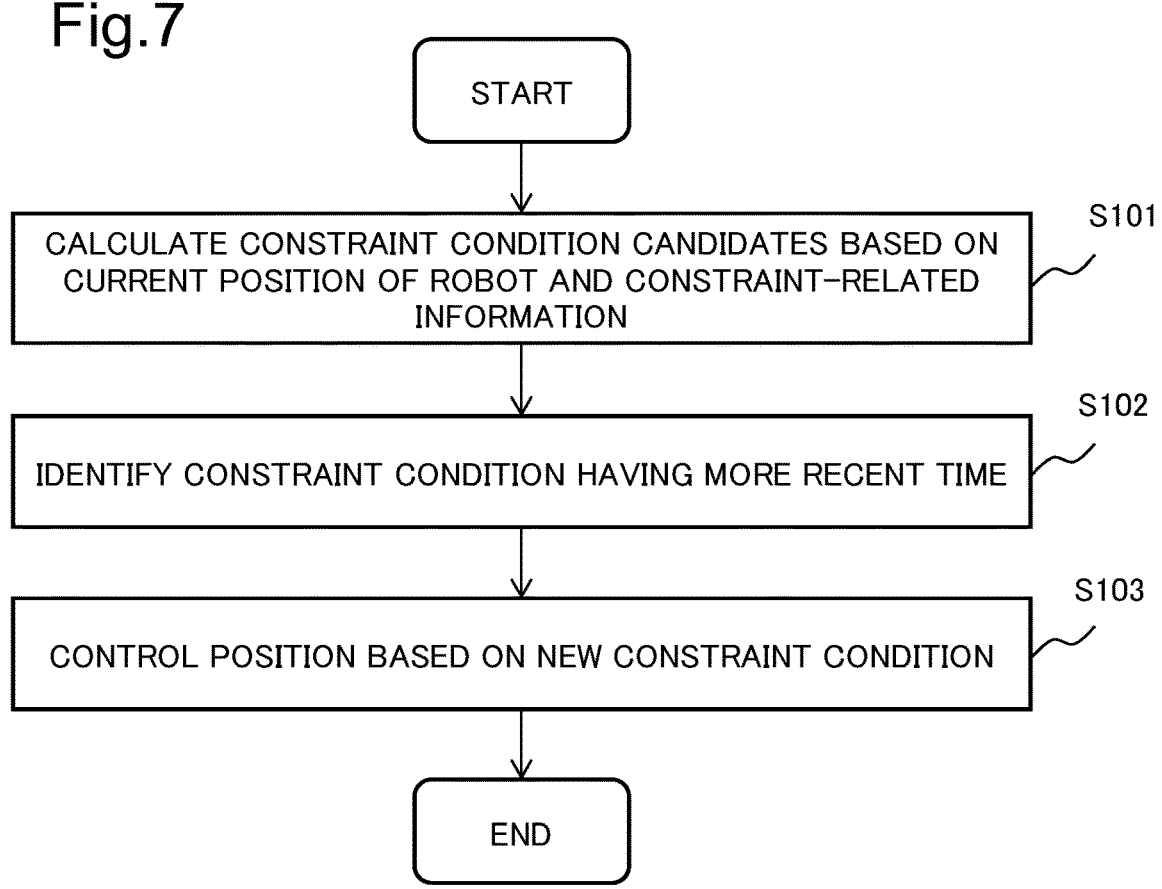
FIG. 7 is a diagram illustrating an example of an operation flow of a control device according to the second example embodiment of the present invention.

The operation of the control device 100 will be described. FIG. 7 is a diagram illustrating an example of an operation flow of the control device 100. Based on the constraint-related information and the current position information about the first robot and the second robot, the constraint condition calculation unit 101 calculates candidates for a constraint condition indicating a condition of a range in which the first robot is movable (step S101). The constraint-related information is information generated using past position information about the first robot and the second robot and used for control of the second robot. After calculating the constraint condition candidates, the constraint condition calculation unit 101 identifies a constraint condition having a more recent time among the calculated constraint condition candidates (step S102). When the new constraint condition is identified, the control unit 102 controls the position of the first robot in such a way that the first robot operates while satisfying the constraint condition identified by the constraint condition calculation unit 101 (step S103).

The control device 100 according to the present example embodiment calculates candidates for a constraint condition indicating the movement range of the first robot based on constraint-related information in which information based on the positions of the first robot and the second robot at past time is used and the current positions of the first robot and the second robot. The control device 100 determines the constraint condition to be used for controlling the position of the first robot by identifying a constraint condition candidate having a more recent time information among the calculated constraint condition candidates. As described above, by using the condition having a more recent time information while sharing the information with the second robot via the constraint-related information, the control device 100 can appropriately update the constraint condition based on the information shared with the counterpart robot and continue the control even in a case where the communication is intermittently performed. As a result, the control device 100 of the present example embodiment can continue the control of the position of the robot even in an environment where communication between the robots is intermittently performed.

Figure 8:
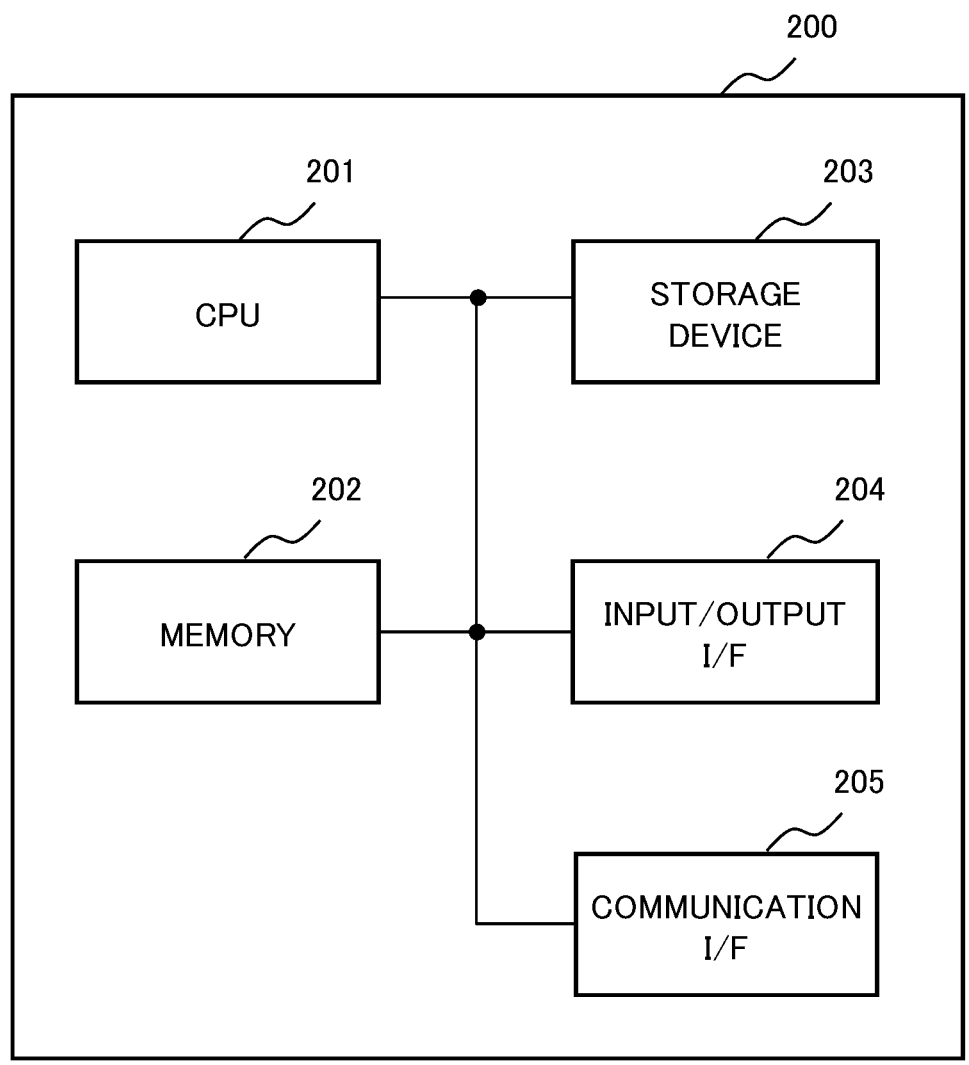
FIG. 8 is a view illustrating another configuration example of the example embodiment of the present invention.

Each processing in the first control device 10 and the second control device 20 of the first example embodiment and the control device 100 of the second example embodiment can be performed by executing a computer program on a computer. FIG. 8 illustrates an example of a configuration of a computer 200 that executes a computer program for performing each processing in the first control device 10 and the second control device 20 of the first example embodiment and the control device 100 of the second example embodiment. The computer 200 includes a CPU 201, a memory 202, a storage device 203, an input/output interface (I/F) 204, and a communication I/F 205.

The CPU 201 reads and executes a computer program for executing each processing from the storage device 203. The CPU 201 may be configured by a combination of a CPU and a graphics processing unit (GPU). The memory 202 includes a dynamic random access memory (DRAM) or the like, and temporarily stores a computer program executed by the CPU 201 and data being processed. The storage device 203 stores a computer program executed by the CPU 201. The storage device 203 includes, for example, a nonvolatile semiconductor storage device. The storage device 203 may include another storage device such as a hard disk drive. The input/output I/F 204 is an interface that receives an input from an operator to output display data and the like. The communication I/F 205 is an interface that transmits and receives data to and from another control device.

The computer program used for executing each processing can also be stored in a recording medium and distributed. The recording medium may include, for example, a magnetic tape for data recording or a magnetic disk such as a hard disk. The recording medium may include an optical disk such as a compact disc read only memory (CD-ROM). A non-volatile semiconductor storage device may be used as a recording medium.

The present invention is described above using the above-described example embodiments as exemplary examples. However, the present invention is not limited to the above-described example embodiments. That is, it will be understood by those of ordinary skill in the art that the present invention can have various aspects without departing from the spirit and scope of the present invention as defined by the claims.

REFERENCE SIGNS LIST

10 first control device
11 communication unit
12 constraint condition calculation unit
13 control unit
14 position information acquisition unit
20 second control device
21 communication unit
22 constraint condition calculation unit
23 control unit
24 position information acquisition unit
100 control device
101 constraint condition calculation unit
102 control unit
200 computer
201 CPU
202 memory
203 storage device
204 input/output I/F
205 communication I/F

The invention claimed is:

1. A control device comprising:
   at least one memory storing instructions; and
   at least one processor configured to access the at least one memory and execute the instructions to:
   receive, from a second robot, constraint-related information, the received constraint-related information being information based on a current position of the second robot and based on positions of a first robot and the second robot at past times;
   calculate candidates based on the constraint-related information that is generated using past position information at each of the past times about the first robot and the second robot and that is information used for controlling the second robot and that is generated using current position information about the first robot and the second robot, the candidates being for a constraint condition indicating a condition of a range in which the first robot is movable;
   identify the constraint condition as the candidate having a more recent time among the calculated candidates for the constraint condition;
   control a position of the first robot in such a way that the first robot operates while the identified constraint condition is satisfied; and
   transmit different constraint-related information to the second robot, the transmitted different constraint-related information being information based on a current position of the first robot and the positions of the first robot and the second robot at the past times,
   wherein the at least one processor is further configured to execute the instructions to:
   calculate candidates for a first constraint condition based on first constraint-related information at a first time and second constraint-related information at a second time;
   calculate candidates for a second constraint condition based on the second constraint-related information, position information received from the second robot, and the position of the first robot;
   determine the first constraint condition and the second constraint condition based on a time; and
   control the position of the first robot in such a way as to satisfy the first constraint condition and the second constraint condition, and
   wherein the at least one processor is further configured to execute the instructions to:
   determine the first constraint condition and the second constraint condition in such a way as to satisfy a condition that a distance between the first robot and the second robot is within a preset distance.

2. A control method performed by a computer and comprising:
   receiving, from a second robot, constraint-related information, the received constraint-related information being information based on a current position of the second robot and based on positions of a first robot and the second robot at past times;
   calculating candidates based on the constraint-related information that is generated using past position information at each of the past times about the first robot and the second robot and that is information used for controlling the second robot and that is generated using current position information about the first robot and the second robot, the candidates being for a constraint condition indicating a condition of a range in which the first robot is movable;

identifying the constraint condition as the candidate having a more recent time among the calculated candidates for the constraint condition;

controlling a position of the first robot in such a way that the first robot operates while the identified constraint condition is satisfied; and transmitting different constraint-related information to the second robot, the transmitted different constraint-related information being information based on a current position of the first robot and the positions of the first robot and the second robot at the past times, wherein the control method further comprises:

calculating candidates for a first constraint condition based on first constraint-related information at a first time and second constraint-related information at a second time;

calculating candidates for a second constraint condition based on the second constraint-related information, position information received from the second robot, and the position of the first robot;

determining the first constraint condition and the second constraint condition based on a time, and in such a way as to satisfy a condition that a distance between the first robot and the second robot is within a preset distance; and controlling the position of the first robot in such a way as to satisfy the first constraint condition and the second constraint condition.

3. A non-transitory program recording medium storing a control program executable by a computer to perform processing comprising:

receiving, from a second robot, constraint-related information, the received constraint-related information being information based on a current position of the second robot and based on positions of a first robot and the second robot at past times;

calculating candidates based on the constraint-related information that is generated using past position information at each of the past times about the first robot and the second robot and that is information used for controlling the second robot and that is generated using current position information about the first robot and the second robot, the candidates being for a constraint condition indicating a condition of a range in which the first robot is movable;

identifying the constraint condition as the candidate having a more recent time among the calculated candidates for the constraint condition;

controlling a position of the first robot in such a way that the first robot operates while the identified constraint condition is satisfied; and transmitting different constraint-related information to the second robot, the transmitted different constraint-related information being information based on a current position of the first robot and the positions of the first robot and the second robot at the past times, wherein the processing further comprises:

calculating candidates for a first constraint condition based on first constraint-related information at a first time and second constraint-related information at a second time;

calculating candidates for a second constraint condition based on the second constraint-related information, position information received from the second robot, and the position of the first robot;

determining the first constraint condition and the second constraint condition based on a time, and in such a way as to satisfy a condition that a distance between the first robot and the second robot is within a preset distance; and controlling the position of the first robot in such a way as to satisfy the first constraint condition and the second constraint condition.

* * * * *